(12) United States Patent
Kawamoto et al.

(10) Patent No.: US 10,507,832 B2
(45) Date of Patent: Dec. 17, 2019

(54) VEHICLE DRIVE CONTROL DEVICE AND CONTROL METHOD FOR VEHICLE DRIVE CONTROL DEVICE

(71) Applicants: JATCO Ltd, Fuji-shi, Shizuoka (JP); NISSAN MOTOR CO., LTD., Yokohama-shi, Kanagawa (JP)

(72) Inventors: Yoshinobu Kawamoto, Seoul (KR); Ruofeng Liu, Isehara (JP); Hideshi Wakayama, Hadano (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 31 days.

(21) Appl. No.: 15/754,749

(22) PCT Filed: Aug. 9, 2016

(86) PCT No.: PCT/JP2016/073466
§ 371 (c)(1),
(2) Date: Feb. 23, 2018

(87) PCT Pub. No.: WO2017/033742
PCT Pub. Date: Mar. 2, 2017

(65) Prior Publication Data
US 2018/0281799 A1    Oct. 4, 2018

(30) Foreign Application Priority Data
Aug. 25, 2015    (JP) .................. 2015-165727

(51) Int. Cl.
*B60W 10/06*     (2006.01)
*B60W 10/10*     (2012.01)
(Continued)

(52) U.S. Cl.
CPC .... *B60W 30/18018* (2013.01); *B60W 10/026* (2013.01); *B60W 10/06* (2013.01);
(Continued)

(58) Field of Classification Search
CPC ...... B60W 10/02; B60W 10/06; B60W 10/10; B60W 30/18018; F16H 61/0031
See application file for complete search history.

(56) References Cited

U.S. PATENT DOCUMENTS

| 5,865,709 A | * | 2/1999 | Tamura | ................. B60W 10/02 477/181 |
| 2003/0109357 A1 | * | 6/2003 | Tabata | ..................... B60K 6/32 477/109 |

(Continued)

FOREIGN PATENT DOCUMENTS

| EP | 2 824 367 A1 | 1/2015 |
| JP | 2010-164178 A | 7/2010 |
| WO | WO-2015/046188 A1 | 4/2015 |

*Primary Examiner* — Edwin A Young
(74) *Attorney, Agent, or Firm* — Foley & Lardner LLP (57) ABSTRACT

In a drive control device, a controller automatically stops an engine if an execution condition of an idling stop is satisfied, and an electric oil pump is driven during an automatic stop of the engine. A first friction engaging element establishes a starting gear position and a second friction engaging element is released when a vehicle starts. A second solenoid drains oil to be supplied to the second friction engaging element according to an indicator current. A drain degree becomes smaller by reducing the indicator current. The controller reduces the indicator current below a minimum value during the automatic stop of the engine.

10 Claims, 9 Drawing Sheets

(51) Int. Cl.

| | |
|---|---|
| *B60W 30/18* | (2012.01) |
| *F02D 29/00* | (2006.01) |
| *F02D 29/02* | (2006.01) |
| *F16H 61/06* | (2006.01) |
| *F16H 61/00* | (2006.01) |
| *B60W 10/02* | (2006.01) |
| *F02D 41/02* | (2006.01) |
| *F02D 41/04* | (2006.01) |
| *F02D 41/06* | (2006.01) |
| *F02D 41/20* | (2006.01) |
| *F02N 11/08* | (2006.01) |
| *F16H 59/44* | (2006.01) |

(52) U.S. Cl.
CPC ............ *B60W 10/10* (2013.01); *F02D 29/00* (2013.01); *F02D 29/02* (2013.01); *F16H 61/0031* (2013.01); *F16H 61/061* (2013.01); *B60W 2520/28* (2013.01); *B60W 2710/065* (2013.01); *B60W 2710/1005* (2013.01); *F02D 41/0215* (2013.01); *F02D 41/042* (2013.01); *F02D 41/065* (2013.01); *F02D 41/20* (2013.01); *F02D 2200/024* (2013.01); *F02N 11/0814* (2013.01); *F16H 2059/446* (2013.01)

(56) References Cited

U.S. PATENT DOCUMENTS

| | | | |
|---|---|---|---|
| 2003/0144111 A1* | 7/2003 | Kato | ............... F16H 61/0021 477/92 |
| 2010/0181159 A1 | 7/2010 | Shimizu et al. | |
| 2016/0230884 A1 | 8/2016 | Miyazono et al. | |

* cited by examiner

VEHICLE DRIVE CONTROL DEVICE AND CONTROL METHOD FOR VEHICLE DRIVE CONTROL DEVICE

TECHNICAL FIELD

The present invention relates to a vehicle drive control device and a control method for vehicle drive control device.

BACKGROUND ART

A technique for performing an idling stop of automatically stopping an engine during a vehicle stop and supplying a hydraulic pressure to a starting clutch by an electromagnetic pump during the idling stop is disclosed in JP2010-164178A. In this technique, the starting clutch is quickly engaged by this so that a vehicle smoothly starts.

SUMMARY OF INVENTION

A hydraulic pressure supplied to a clutch is generally controlled by a solenoid. Specifically, the solenoid is provided in an oil passage communicating with the clutch and the hydraulic pressure supplied to the clutch is controlled by adjusting a drain amount of oil supplied to the clutch by the solenoid.

Normally open type solenoids are generally used for clutches other than starting clutches. A normally open type solenoid is such a solenoid that a drain degree is minimized when an indicator current is zero and maximized when the indicator current is largest.

Normally open type solenoids are used for clutches other than starting clutches for the following reason. Specifically, a failure such as disconnection between a solenoid and a power supply possibly occurs during the travel of a vehicle. In the case of using a normally open type clutch for a starting clutch, a hydraulic pressure is supplied to the starting clutch according to this and the starting clutch is engaged. Thus, in this case, driveability is possibly deteriorated due to a sudden deceleration associated with a down shift when a failure as described above occurs.

In the case of using a normally open type solenoid for a clutch other than a starting clutch, even if a failure as described above occurs, a gear position is established by the clutch other than the starting clutch. Thus, minimum required travel such as evacuation travel is possible while a sudden deceleration is suppressed.

However, the technique of JP2010-164178A is configured such that the hydraulic pressure is supplied to the starting clutch during the idling stop, but no hydraulic pressure is supplied to other clutches to be released during start.

Thus, if the normally open type solenoids are used for the clutches other than the starting clutch, a current needs to be constantly output to the solenoid so that no hydraulic pressure is supplied to the clutches other than the starting clutch during the idling stop. As a result, power consumption is increased by that much.

The present invention was developed in view of such a technical problem and aims to provide a vehicle drive control device capable of reducing power consumption during an automatic stop of a travel drive source made in a vehicle stopped state and a control method for vehicle drive control device.

A vehicle drive control device according to a certain aspect of the present invention includes a drive source control unit configured to automatically stop a travel drive source if an automatic stop condition is satisfied, the automatic stop condition being satisfied in a stopped state of a vehicle, an electric oil pump configured to be driven during an automatic stop of the travel drive source according to the satisfaction of the automatic stop condition, a first friction engaging element configured to have oil supplied thereto from the electric oil pump during the automatic stop and establish a starting gear position, a second friction engaging element configured to be released when the vehicle starts with the first friction engaging element set in a power transmission state, a solenoid configured to drain the oil to be supplied to the second friction engaging element according to an indicator current, a drain degree of the solenoid becoming smaller by reducing the indicator current, and a solenoid control unit configured to reduce the indicator current to the solenoid below a minimum value of the indicator current during the automatic stop, the second friction engaging element being released at the minimum value.

According to another aspect of the present invention, A control method for a vehicle drive control device with an electric oil pump, a first friction engaging element configured to have oil supplied thereto from the electric oil pump and establish a starting gear position, a second friction engaging element configured to be released when the vehicle starts with the first friction engaging element set in a power transmission state, and a solenoid configured to drain the oil to be supplied to the second friction engaging element according to an indicator current, a drain degree of the solenoid becoming smaller by reducing the indicator current is provided. The control method for the vehicle driving control includes automatically stopping the travel drive source if an automatic stop condition is satisfied, the automatic stop condition being satisfied in a stopped state of a vehicle, driving the electric oil pump during an automatic stop of the travel drive source according to the satisfaction of the automatic stop condition and supplying the oil to the first friction engaging element and the second friction engaging element, and reducing the indicator current to the solenoid below a minimum value of the indicator current during the automatic stop, the second friction engaging element being released at the minimum value.

According to these aspects, the engagement of the second friction engaging element is permitted to reduce the indicator current to the solenoid as described above during the automatic stop of the travel drive source made in the vehicle stopped state, wherefore power consumption can be reduced.

DESCRIPTION OF EMBODIMENTS

Hereinafter, embodiments of the present invention are described with reference to the accompanying drawings.

First Embodiment

Figure 1:
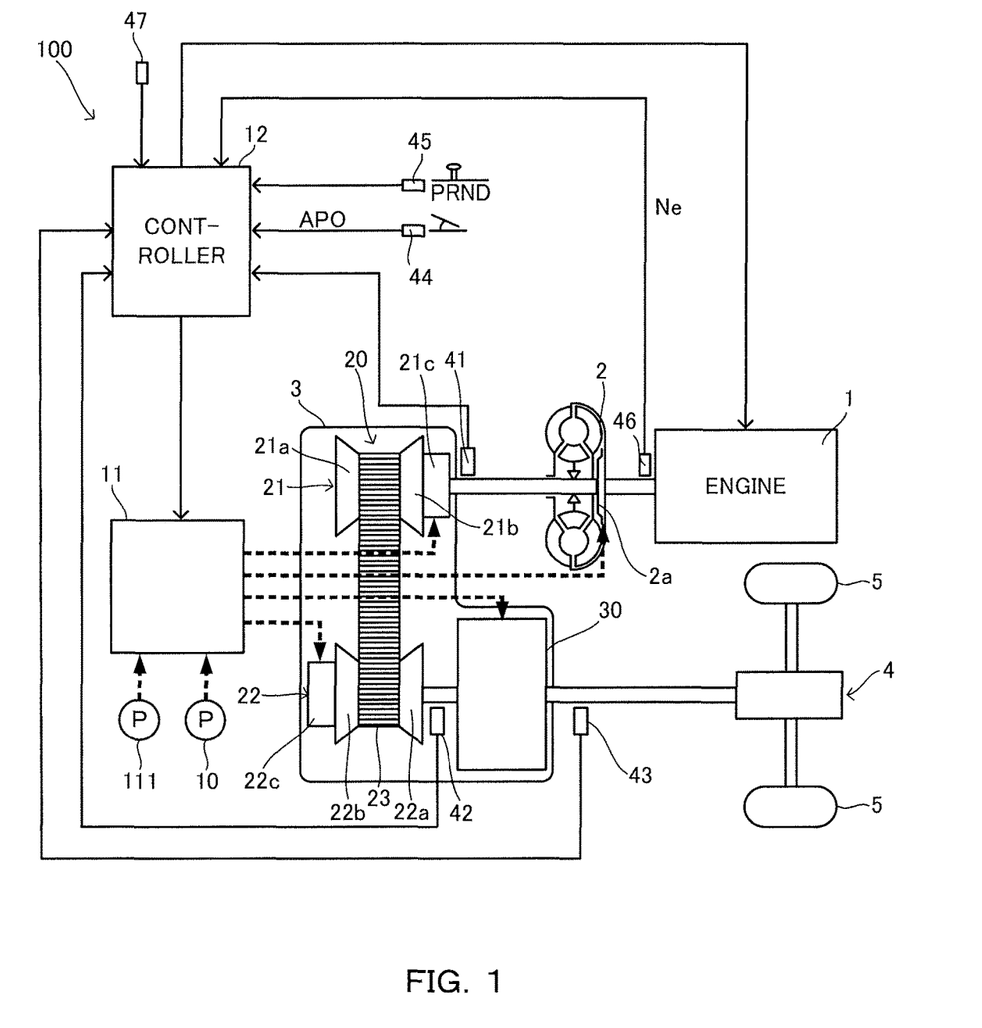
FIG. 1 is a diagram showing an essential part of a vehicle including a vehicle drive control device.

FIG. 1 is a diagram showing an essential part of a vehicle including a vehicle drive control device 100. The vehicle includes an engine 1, a torque converter 2, a variator 20, a sub-transmission mechanism 30, an axle unit 4 and drive wheels 5. The vehicle drive control device 100 is merely referred to as the drive control device 100 below.

The engine 1 constitutes a travel drive source of the vehicle. The torque converter 2 transmits power via fluid. In the torque converter 2, power transmission efficiency can be enhanced by engaging a lock-up clutch 2a. The variator 20 and the sub-transmission mechanism 30 output an input rotation speed in the form of a rotation speed corresponding to a speed ratio. The axle unit 4 is configured to include a deceleration gear, a differential device and a drive axle. The power of the engine 1 is transmitted to the drive wheels 5 via the torque converter 2, the variator 20, the sub-transmission mechanism 30 and the axle unit 4.

The variator 20 is a continuously variable transmission mechanism and includes a primary pulley 21, a secondary pulley 22 and a belt 23. Primary is referred to as PRI and secondary is referred to as SEC below.

The PRI pulley 21 includes a fixed pulley 21a, a movable pulley 21b and a PRI chamber 21c. In the PRI pulley 21, a PRI pressure is supplied to the PRI chamber 21c.

The SEC pulley 22 includes a fixed pulley 22a, a movable pulley 22b and a SEC chamber 22c. In the SEC pulley 22, a SEC pressure is supplied to the SEC chamber 22c.

The belt 23 is wound on a V-shaped sheave surface formed by the fixed pulley 21a and the movable pulley 21b of the PRI pulley 21 and a V-shaped sheave surface formed by the fixed pulley 22a and the movable pulley 22b of the SEC pulley 22.

The variator 20 constitutes a belt continuously variable transmission mechanism which is shifted by changing a groove width of each of the PRI pulley 21 and the SEC pulley 22 to change a winding diameter of the belt 23.

In such a variator 20, the movable pulley 21b operates and the groove width of the PRI pulley 21 is changed by controlling the PRI pressure. Further, the movable pulley 22b operates and the groove width of the SEC pulley 22 is changed by controlling the SEC pressure.

The PRI pressure and the SEC pressure are generated by a hydraulic control circuit 11 using a line pressure PL as a source pressure. The line pressure PL may be applied as one of the PRI pressure and the SEC pressure. In this case, the variator 20 can be constituted as a single pressure regulation type variator.

The sub-transmission mechanism 30 is a stepped transmission mechanism and has two forward and one reverse gear positions. The sub-transmission mechanism 30 has a first speed and a second speed having a smaller speed ratio than the first speed as the forward gear positions. The sub-transmission mechanism 30 is provided in series on an output side of the variator 20 in a power transmission path from the engine 1 to the drive wheels 5.

The sub-transmission mechanism 30 may be directly connected to the variator 20 or may be indirectly connected to the variator 20 via another component such as a gear train. The sub-transmission mechanism 30 may have three or more forward gear positions.

The sub-transmission mechanism 30 constitutes an automatic transmission mechanism 3 together with the variator 20. The variator 20 and the sub-transmission mechanism 30 may be structurally configured as separate transmission mechanisms.

The vehicle further includes an oil pump 10, the hydraulic control circuit 11 and a controller 12. The hydraulic control circuit 11 may be grasped as a component including the oil pump 10.

The oil pump 10 is driven by the engine 1 to discharge oil. A hydraulic pressure is supplied to the variator 20 and the sub-transmission mechanism 30 using the oil pump 10 as a hydraulic pressure source.

The hydraulic control circuit 11 adjusts the pressure of the oil discharged by the oil pump 10, i.e. the hydraulic pressure, and transmits the adjusted hydraulic pressure to each part of the variator 20 and the sub-transmission mechanism 30. For example, the line pressure PL, the PRI pressure and the SEC pressure are adjusted in the hydraulic control circuit 11. An electric oil pump 111 is further provided in the hydraulic control circuit 11. The electric oil pump 111 is described later.

The controller 12 is an electronic control device and controls the hydraulic control circuit 11. Output signals of a rotation sensor 41, a rotation sensor 42 and a rotation sensor 43 are input to the controller 12.

The rotation sensor 41 is a variator input-side rotation sensor for detecting a rotation speed on an input side of the variator 20. The rotation sensor 42 is a variator output-side rotation sensor for detecting a rotation speed on an output side of the variator 20. The rotation sensor 42 specifically detects the rotation speed on the output side of the variator 20 and an input side of the sub-transmission mechanism 30. The rotation sensor 43 is a sub-transmission mechanism output-side rotation sensor for detecting a rotation speed on an output side of the sub-transmission mechanism 30. The rotation sensor 43 is configured to detect a pulse signal indicating a rotating state of the drive wheels 5.

The rotation speed on the input side of the variator 20 is specifically a rotation speed of an input shaft of the variator 20. The rotation speed on the input side of the variator 20 may be, for example, a rotation speed at a position opposite to the variator 20 across a gear train in the aforementioned power transmission path. The same applies to the rotation speed on the output side of the variator 20 and the rotation speed on the output side of the sub-transmission mechanism 30.

Besides these, output signals of an accelerator pedal opening sensor 44, an inhibitor switch 45, an engine rotation sensor 46, an oil temperature sensor 47 and the like are input to the controller 12.

The accelerator pedal opening sensor 44 detects an accelerator pedal opening APO indicating an operated amount of an accelerator pedal. The inhibitor switch 45 detects the position of a select lever. The engine rotation sensor 46 detects a rotation speed Ne of the engine 1. The oil temperature sensor 47 detects an oil temperature of the automatic transmission mechanism 3.

The controller 12 generates a shift control signal on the basis of these signals and outputs the generated shift control signal to the hydraulic control circuit 11. The hydraulic control circuit 11 controls the line pressure, the PRI pressure and the SEC pressure and switches a hydraulic pressure path on the basis of the shift control signal from the controller 12.

In this way, the hydraulic pressure corresponding to the shift control signal is transmitted from the hydraulic control circuit 11 to each part of the variator 20 and the sub-transmission mechanism 30. As a result, the speed ratios of the variator 20 and the sub-transmission mechanism 30 are changed to speed ratios corresponding to the shift control signal, i.e. target speed ratios.

The drive control device 100 is a device for controlling the transmission of the power from the engine 1 to the drive wheels 5 and configured to include the oil pump 10, the hydraulic control circuit 11, the controller 12 and the rotation sensors 41, 42 and 43 besides the torque converter 2, the variator 20 and the sub-transmission mechanism 30.

In the present embodiment, the controller 12 automatically stops and restarts the engine 1 besides executing the shift control of the variator 20 and the sub-transmission mechanism 30. The engine 1 may be automatically stopped and restarted, for example, by an engine controller for executing an engine control. In this case, the drive control device 100 can be grasped to further include the engine controller and an integrated controller for integrating the shift control and the engine control.

Next, the hydraulic control circuit 11 and the sub-transmission mechanism 30 constituting the drive control device 100 are further described.

Figure 2:
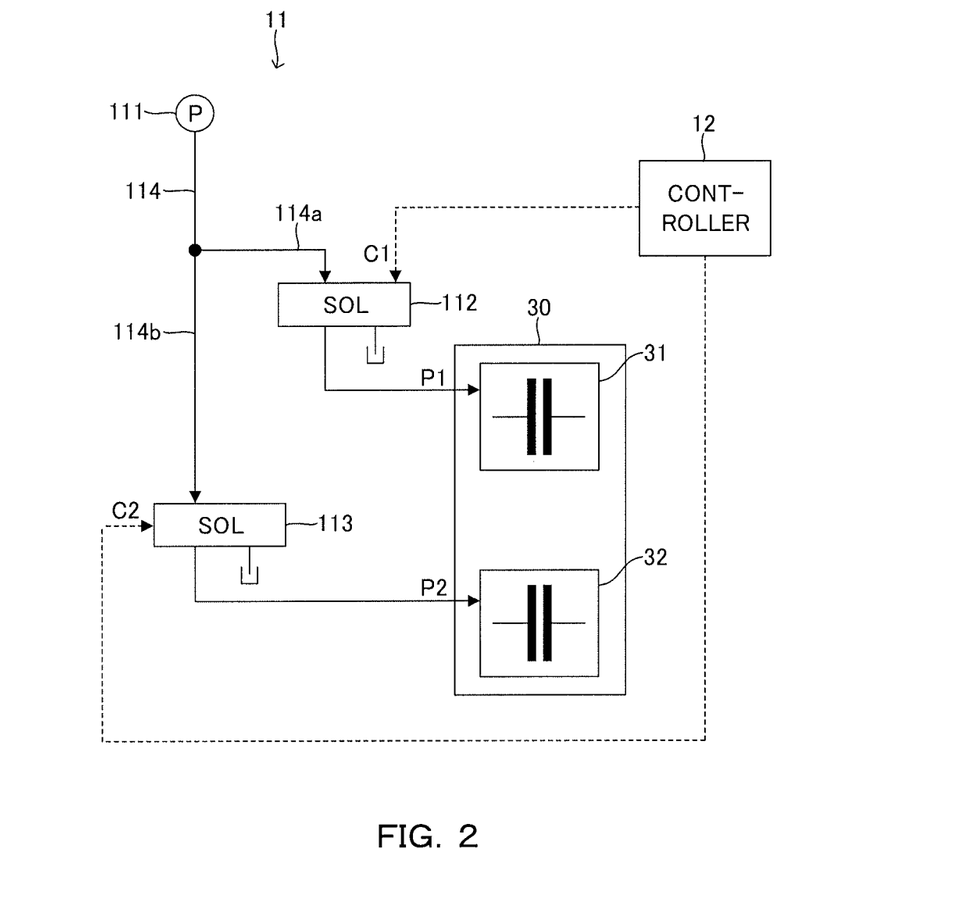
FIG. 2 is a diagram showing essential parts of a hydraulic control circuit and a sub-transmission mechanism.

FIG. 2 is a diagram showing essential parts of the hydraulic control circuit 11 and the sub-transmission mechanism 30. The hydraulic control circuit 11 includes the electric oil pump 111, a first solenoid 112, a second solenoid 113 and an oil passage 114. The sub-transmission mechanism 30 includes a first friction engaging element 31 and a second friction engaging element 32. Solenoid is referred to as SOL below.

The electric oil pump 111 supplies oil to the first and second friction engaging elements 31, 32. The electric oil pump 111 is connected to the first and second friction engaging elements 31, 32 via the oil passage 114.

The oil passage 114 is branched and connected to the first and second friction engaging elements 31, 32. A first branch oil passage 114a is a part of the oil passage 114 branched and connected from the electric oil pump 111 to the first friction engaging element 31. A second branch oil passage 114b is a part of the oil passage 114 branched and connected from the electric oil pump 111 to the second friction engaging element 32.

The first SOL 112 is provided in the first branch oil passage 114a. The first SOL 112 drains the oil to be supplied to the first friction engaging element 31 according to an indicator current C1. In the first SOL 112, a drain degree increases by reducing the indicator current C1. A normally closed type SOL in which a drain degree is maximized when the indicator current C1 is zero and minimized when the indicator current C1 is largest is used as the first SOL 112.

The first SOL 112 controls a supplied hydraulic pressure P1 by adjusting a drain oil amount by the drain degree. Since the drain degree increases by reducing the indicator current C1 in the first SOL 112, the first SOL 112 has a property that the supplied hydraulic pressure P1 increases as the indicator current C1 increases as a changing property of the supplied hydraulic pressure P1 according to the indicator current C1. Thus, the first SOL 112 can engage the first friction engaging element 31 by the supplied hydraulic pressure P1, for example, when the indicator current C1 is largest.

The second SOL 113 is provided in the second branch oil passage 114b. The second SOL 113 drains the oil to be supplied to the second friction engaging element 32 according to an indicator current C2. In the second SOL 113, a drain degree decreases by reducing the indicator current C2. A normally open type SOL in which a drain degree is minimized when the indicator current C2 is zero and maximized when the indicator current C2 is largest is used as the second SOL 113.

The second SOL 113 controls a supplied hydraulic pressure P2 by adjusting a drain oil amount by the drain degree. Since the drain degree decreases by reducing the indicator current C2 in the second SOL 113, the second SOL 113 has a property that the supplied hydraulic pressure P2 increases as the indicator current C2 decreases as a changing property of the supplied hydraulic pressure P2 according to the indicator current C2. Thus, the second SOL 113 can engage the second friction engaging element 32 by the supplied hydraulic pressure P2, for example, when the indicator current C2 is zero.

The first SOL 112 and the second SOL 113 are controlled by the controller 12. Linear solenoids can be used as the first SOL 112 and the second SOL 113.

The first friction engaging element 31 is a friction engaging element for establishing the first speed, i.e. a starting gear position. The second friction engaging element 32 is a friction engaging element for establishing the second speed, i.e. a gear position having a higher speed ratio than the starting gear position. The second friction engaging element 32 is released when the vehicle starts with the first friction engaging element 31 set in a power transmission state. In this way, interlocking is prevented.

The electric oil pump 111 may be configured to supply the oil to the first and second friction engaging elements 31, 32 via a manual valve which is driven according to the operation of the select lever. The manual valve can be configured to be opened when a selection range by the select lever is a permissible range for permitting a shift of the sub-transmission mechanism 30.

Figure 3:
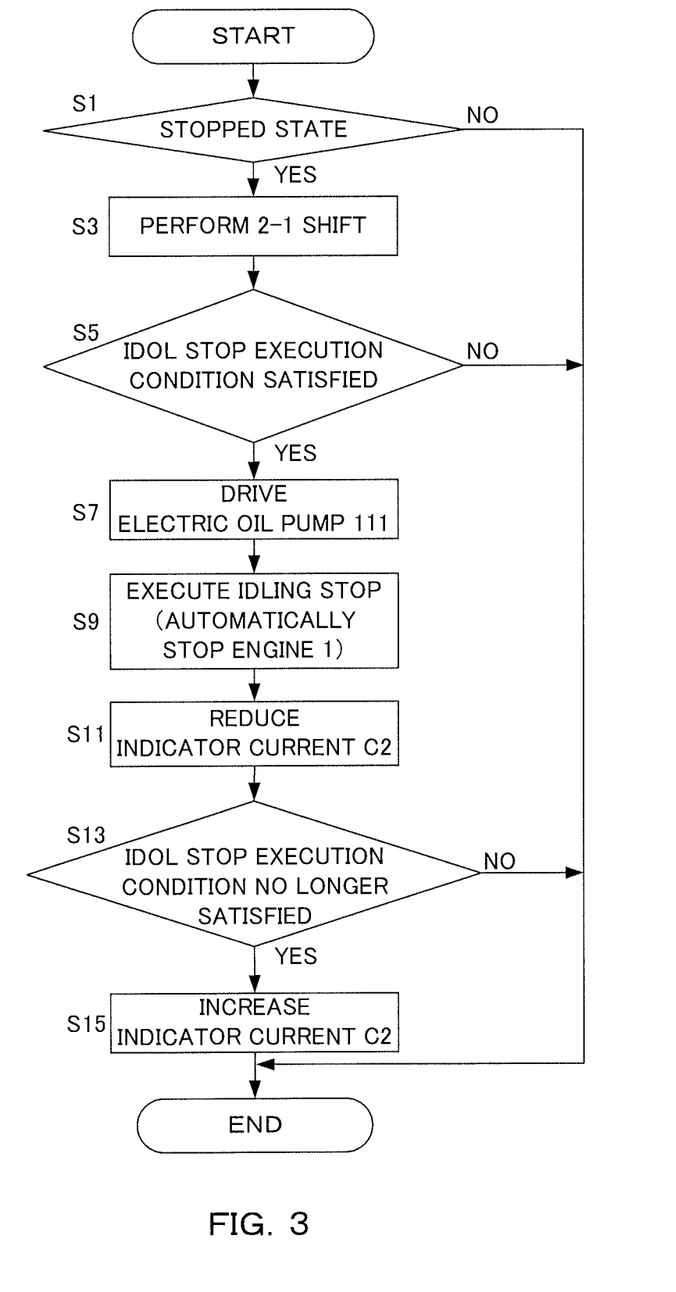
FIG. 3 is a flow chart showing an example of a control executed in a first embodiment.

Next, an example of a control executed by the controller 12 in the present embodiment is described using a flow chart shown in FIG. 3. A process shown in FIG. 3 can be repeatedly performed every minute time.

In Step S1, the controller 12 determines whether or not the vehicle is stopped, i.e. in a stopped state. Whether or not the vehicle is in the stopped state can be determined on the basis of whether or not a vehicle speed VSP is zero, and is specifically determined as follows.

Specifically, the controller 12 determines that the vehicle is stopped if an elapsed time after the detection of a pulse signal and before the detection of a next pulse signal by the rotation sensor 43 is equal to or longer than a vehicle stop determination time while determining that the vehicle is not stopped when the elapsed time is shorter than the vehicle stop determination time.

If the determination is negative in Step S1, the process of this flow chart is once ended. If the determination is affirmative in Step S1, the process proceeds to Step S3.

In Step S3, the controller 12 performs a 2-1 shift of downshifting the gear position of the sub-transmission mechanism 30 from the second speed to the first speed.

At the time of the 2-1 shift, the supplied hydraulic pressure P1 to the first friction engaging element 31 is increased to engage the first friction engaging element 31. Further, the supplied hydraulic pressure P2 to the second friction engaging element 32 is reduced to release the second friction engaging element 32.

Accordingly, at the time of the 2-1 shift, the indicator current C1 to the normally closed type first SOL 112 is increased. Further, the indicator current C2 to the normally open type second SOL 113 is also increased.

In Step S5, the controller 12 determines whether or not an execution condition of an idling stop has been satisfied. The execution condition of the idling stop is an example of an automatic stop condition which is satisfied when the vehicle is in the stopped state and is specifically, for example, the following condition.

Specifically, the execution conditions of the idling stop include, for example, that the vehicle speed VSP is zero, that a brake pedal is depressed and that the accelerator pedal is not depressed. Further, the execution conditions of the idling stop include, for example, that the gear position of the sub-transmission mechanism 30 is the first speed, thus, that the 2-1 shift has been completed, that the speed ratio of the variator 20 is a lowest speed ratio and that the selection range by the select lever is the permissible range for permitting the execution of the idling stop. Besides these, a water temperature of the engine 1, an oil temperature of the automatic transmission mechanism 3 and a road surface gradient can be, for example, taken into consideration for the execution control of the idling stop.

If the determination is negative in Step S5, the process of this flow chart is once ended. If the determination is affirmative in Step S5, the process proceeds to Step S7.

In Step S7, the controller 12 drives the electric oil pump 111. In this way, the oil can be supplied from the electric oil pump 111 to the first and second friction engaging elements 31, 32.

In Step S9, the controller 12 automatically stops the engine 1 by executing the idling stop. As in this example, the idling stop can be executed after the drive of the electric oil pump 111 is started.

In Step S11, the controller 12 reduces the indicator current C2 to the second SOL 113. In this way, the supplied hydraulic pressure P2 to the second friction engaging element 32 increases and the second friction engaging element 32 is engaged.

In Step S13, the controller 12 determines whether or not the execution condition of the idling stop is no longer satisfied. The execution condition of the idling stop is not satisfied, for example, when a driver releases the brake pedal to start the vehicle. If the determination is negative in Step S13, the process of this flow chart is once ended. If the determination is affirmative in Step S13, the process proceeds to Step S15.

In Step S15, the controller 12 increases the indicator current C2. In this way, the supplied hydraulic pressure P2 to the second friction engaging element 32 decreases and the second friction engaging element 32 is released. After Step S15, the process of this flow chart is once ended.

Figure 4:
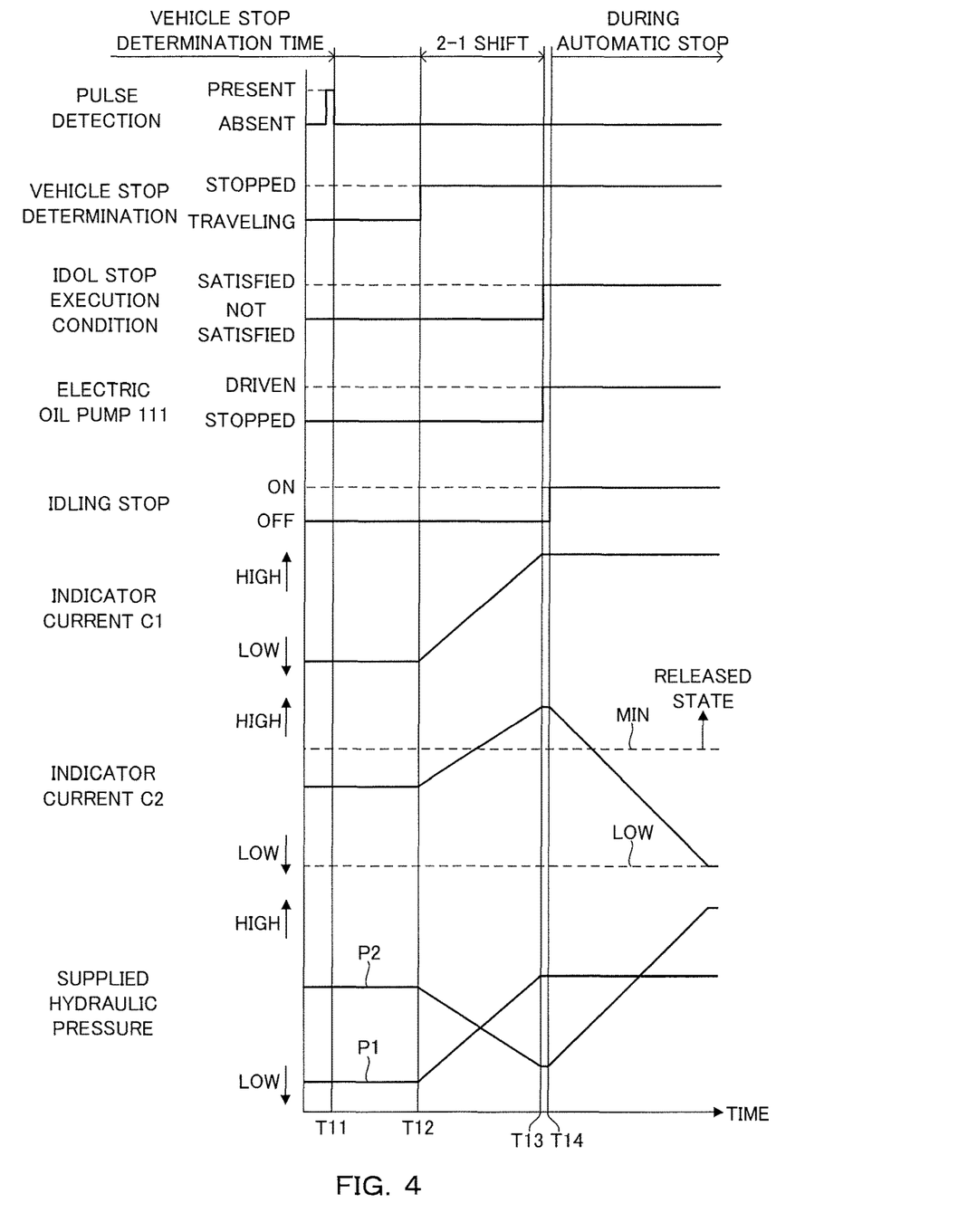
FIG. 4 is a diagram showing a first timing chart.

FIG. 4 is a diagram showing a first timing chart, which is an example of a timing chart corresponding to a control executed by the controller 12. In the first timing chart, a case of stopping the vehicle is described.

Before timing T11, a pulse is detected by the rotation sensor 43. The detected pulse is no longer detected at timing T11. An elapsed time from timing T11 becomes the vehicle stop determination time at timing T12. Thus, the vehicle is determined to be stopped from timing T12.

The 2-1 shift is started from timing T12. Thus, the indicator current C1 to the first SOL 112 and the indicator current C2 to the second SOL 113 are increased from timing T12. As a result, the supplied hydraulic pressure P1 to the first friction engaging element 31 increases and the supplied hydraulic pressure P2 to the second friction engaging element 32 decreases.

At timing T13, the 2-1 shift is completed and the execution condition of the idling stop is satisfied. Thus, the drive of the electric oil pump 111 is started at timing T13.

At timing T14, the idling stop is started. Thus, the engine 1 is automatically stopped according to the satisfaction of the idling stop execution condition from timing T14.

That the engine 1 is automatically stopped includes both a state after timing T14 at the start of the idling stop where the rotation speed Ne decreases toward zero by the idling stop and a state where the rotation speed Ne of the engine 1 is made zero by the idling stop.

The drive of the electric oil pump 111 started at timing T13 continues during the automatic stop of the engine 1 after timing T14. In this way, the oil is supplied from the electric oil pump 111 to the first and second friction engaging elements 31, 32 during the automatic stop of the engine 1.

At timing T14, a decrease of the indicator current C2 is also started. As a result, the supplied hydraulic pressure P2 starts increasing. In this example, the indicator current C2 is reduced at a fixed rate according to the elapsed time, with the result that the supplied hydraulic pressure P2 increases at a fixed rate according to the elapsed time.

The indicator current C2 is reduced below a minimum value MIN during the automatic stop of the engine 1 after timing T14. The minimum value MIN is a minimum value of the indicator current C2 at which the second friction engaging element 32 is released. In reducing the indicator current C2 below the minimum value MIN, the indicator current C2 may be reduced to a magnitude at which slip occurs in the second friction engaging element 32 or may be reduced to a magnitude at which the second friction engaging element is completely engaged.

The indicator current C2 has a lower limit value LOW. The lower limit value LOW is larger than zero and set in a range where an actual current value is detectable. The lower limit value LOW is, for example, 100 mA and can be set in advance on the basis of an experiment or the like. The lower limit value LOW can be set at a minimum value at which an actual current value is detectable. In this example, the indicator current C2 is reduced to the lower limit value LOW.

Figure 5:
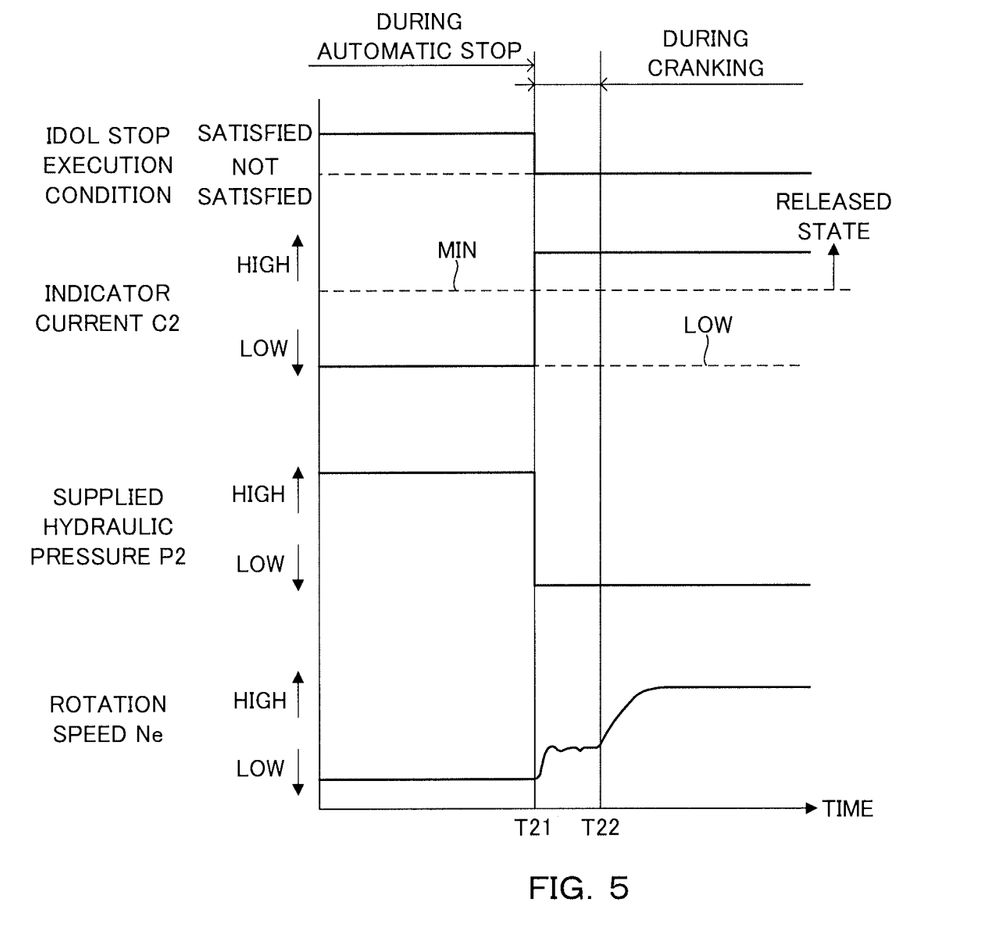
FIG. 5 is a diagram showing a second timing chart.

FIG. 5 is a diagram showing a second timing chart, which is an example of a timing chart corresponding to the control executed by the controller 12. In the second timing chart, a case of starting the vehicle is described.

At timing T21, the execution condition of the idling stop is no longer satisfied. Thus, an increase of the indicator current C2 to the second SOL 113 is started from timing T21. As a result, the supplied hydraulic pressure P2 to the second friction engaging element 32 decreases. In this example, the supplied hydraulic pressure P2 is reduced in a stepwise manner by increasing the indicator current C2 to a value larger than the minimum value MIN in a stepwise manner.

At timing T21, the restart of the engine 1 is also started. Thus, the rotation speed Ne also increases from timing T21. The rotation speed Ne largely increases from timing T22 through the cranking of the engine 1.

Next, main functions and effects of the drive control device 100 according to the present embodiment are described. The drive control device 100 includes the controller 12 serving as a drive source control unit configured to automatically stop the engine 1 if the execution condition of the idling stop is satisfied, the electric oil pump 111, the first friction engaging element 31, the second friction engaging element 32 and the second SOL 113. The controller 12 is provided as a solenoid control unit configured to reduce the indicator current C2 below the minimum value MIN during the automatic stop of the engine 1 besides being provided as the drive source control unit.

According to the drive control device 100 thus configured, the indicator current C2 is reduced as described above by permitting the engagement of the second friction engaging element 32 during the automatic stop of the engine 1 made in the vehicle stopped state. This is because an unintended drive force is not transmitted to the drive wheels 5 or an unintended braking force is not generated in the vehicle stopped state even if the second friction engaging element 32 is engaged. According to the drive control device 100 thus configured, since the indicator current C2 is reduced as described above, power consumption can be reduced during the automatic stop of the engine 1 made in the vehicle stopped state.

It is also possible to set a decrease start timing of the indicator current C2, for example, at a vehicle stopping timing. However, at the vehicle stopping timing, the automatic stop of the engine 1 according to the satisfaction of the execution condition of the idling stop is not started. Thus, the engine 1 is in a driven state and the vehicle is in a state where power can be transmitted from the engine 1 to the drive wheels 5 in response to a start request of the driver given by releasing the brake pedal or depressing the accelerator pedal.

If the indicator current C2 is reduced in such a state, a braking force by the second friction engaging element 32 is generated and the sub-transmission mechanism 30 is interlocked depending on the magnitude of the indicator current C2. As a result, power corresponding to the start request of the driver cannot be transmitted from the engine 1 to the drive wheels 5 and a situation where a sense of incongruity is given to the driver may possibly occur.

In view of such a situation, in the drive control device 100 in which a travel drive source is configured by the engine 1, the controller 12 serving as the solenoid control unit starts the decrease of the indicator current C2 simultaneously with the start of the automatic stop of the engine 1 according to the satisfaction of the execution condition of the idling stop.

According to the drive control device 100 thus configured, even if the driver gives a start request after the decrease of the indicator current C2 is started, it takes time to restart the engine 1, wherefore the indicator current C2 can be increased during that time. Thus, the braking force by the second friction engaging element 32 can be made zero or reduced during that time. Therefore, it is possible to prevent a sense of incongruity from being given to the driver or reduce the sense of incongruity given to the driver.

The drive control device 100 thus configured is specifically suitable when the engine 1 is configured to be restarted only by a starter if the engine 1 is restarted after the start of the automatic stop of the engine 1 according to the satisfaction of the execution condition of the idling stop by the controller 12 serving as the drive source control unit.

This is because, in the case of restarting the engine 1 by the starter, the engine 1 cannot be restarted unless the rotation speed Ne is reduced to a rotation speed at which the engine 1 can be started by the starter even if the start request is given immediately after the start of the automatic stop.

Thus, in this case, a situation where a sense of incongruity is given to the driver can be improved by zeroing or reducing the braking force by the second friction engaging element 32 while the rotation speed Ne is reduced to the rotation speed at which the engine can be started by the starter. Further, since the decrease of the indicator current C2 is started without waiting for a decrease of the rotation speed Ne in this case, power consumption can be suitably reduced.

In the drive control device 100, the indicator current C2 has the lower limit value LOW larger than zero and set in the range where an actual current value is detectable.

According to the drive control device 100 thus configured, when the actual current value is zero, a cause thereof can be distinguished to be not the indicator current C2, but a failure such as disconnection. Thus, a failure such as disconnection can be detected while power consumption is suppressed as much as possible.

In the drive control device 100, the controller 12 serving as the solenoid control unit starts the increase of the indicator current C2 when the execution condition of the idling stop is no longer satisfied.

According to the drive control device 100 thus configured, the start request of the driver can be detected quickly and the increase of the indicator current C2 can be started since the execution condition of the idling stop is no longer satisfied. Thus, a reduction of the braking force by the second friction engaging element 32 can be started as quickly as possible. Therefore, it can be suppressed as much as possible in terms of timing that the braking force by the second friction engaging element 32 impedes the start of the vehicle.

Second Embodiment

In the present embodiment, an engine 1 is configured to be restarted by fuel recovery performed at a recovery possible rotation speed Ne1 or higher besides being restarted by a starter. Further, a controller 12 is configured to execute a control described next. Besides these points, a drive control device 100 according to the present embodiment is configured similarly to the drive control device 100 according to the first embodiment.

Here, the restart responsiveness of the engine 1 is higher in the case of restart by fuel recovery than in the case of restart by the starter. Thus, if a start request is given after the start of the automatic stop of the engine 1, a time until power is transmitted from the engine 1 to drive wheels 5 in response to the start request is shorter in the case of restart by fuel recovery than in the case of restart by the starter.

Thus, if the engine 1 is restarted by fuel recovery, even if it is attempted to eliminate a braking force by a second friction engaging element 32 by increasing an indicator current C2 in response to a start request given after the start of a decrease of the indicator current C2, there is a possibility that it is not sufficiently in time.

In view of such a situation, the controller 12 is configured as described next in the present embodiment.

Figure 6:
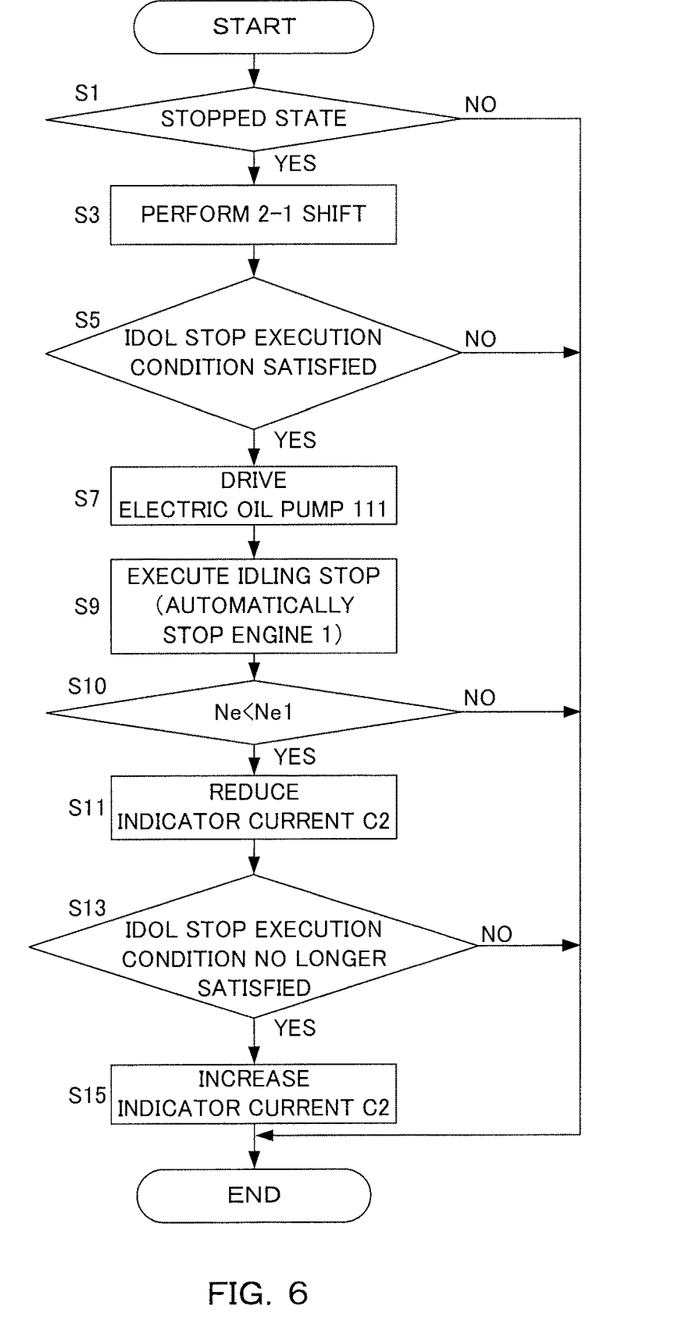
FIG. 6 is a flow chart showing an example of a control executed in a second embodiment.

FIG. 6 is a flow chart showing an example of a control executed by the controller 12 in the present embodiment. The flow chart shown in FIG. 6 is the same as that shown in FIG. 3 except that a processing of Step S10 is added after Step S9. Thus, Step S10 is mainly described here.

In Step S10, the controller 12 determines whether or not a rotation speed Ne is lower than the recovery possible rotation speed Ne1. The recovery possible rotation speed Ne1 is a rotation speed higher than a rotation speed at which the engine can be started by the starter and can be set in advance on the basis of an experiment or the like. If the determination is negative in Step S10, the process of this flow chart is once ended. If the determination is affirmative in Step S10, the process proceeds to Step S11.

As just described, in the drive control device 100 according to the present embodiment, the controller 12 serving as a solenoid control unit starts the decrease of the indicator current C2 when the automatic stop of the engine 1 is started according to the satisfaction of an execution condition of an idling stop and the rotation speed Ne becomes lower than the recovery possible rotation speed Ne1.

Thus, even if the automatic stop of the engine 1 is started, the decrease of the indicator current C2 is not started when the rotation speed Ne is equal to or higher than the recovery possible rotation speed Ne1. Specifically, when the engine 1 can be restarted by fuel recovery in response to a start request by the driver, the generation of the braking force by the second friction engaging element 32 is prevented.

Thus, according to the drive control device 100 relating to the present embodiment, the responsiveness of power transmission supposed to be performed in response to a start request can be ensured even if the engine 1 is restarted by fuel recovery. Further, since the engine 1 needs to be restarted by the starter if the rotation speed Ne becomes lower than the recovery possible rotation speed Ne1, a sense of incongruity given to the driver can be improved as in the first embodiment described above.

Third Embodiment

A drive control device 100 according to the present embodiment is configured similarly to the drive control device 100 in the first embodiment except that a controller 12 is configured as described below. A similar change may be made, for example, for the drive control device 100 according to the second embodiment.

Here, an elapsed time after the detection of a pulse signal and before the detection of a next pulse signal by a rotation sensor 43 can be equal to or longer than a vehicle stop determination time also when drive wheels 5 slowly rotate such as during slow deceleration.

In this case, although the drive wheels 5 are rotating, the vehicle is determined to be stopped and an execution condition of an idling stop can be satisfied. Thus, when an indicator current C2 is reduced during an automatic stop of an engine 1, a sudden braking force by a second friction engaging element 32 is generated and a sense of incongruity is possibly given to a driver.

In view of such a situation, the controller 12 is configured as described next in the present embodiment.

Figure 7:
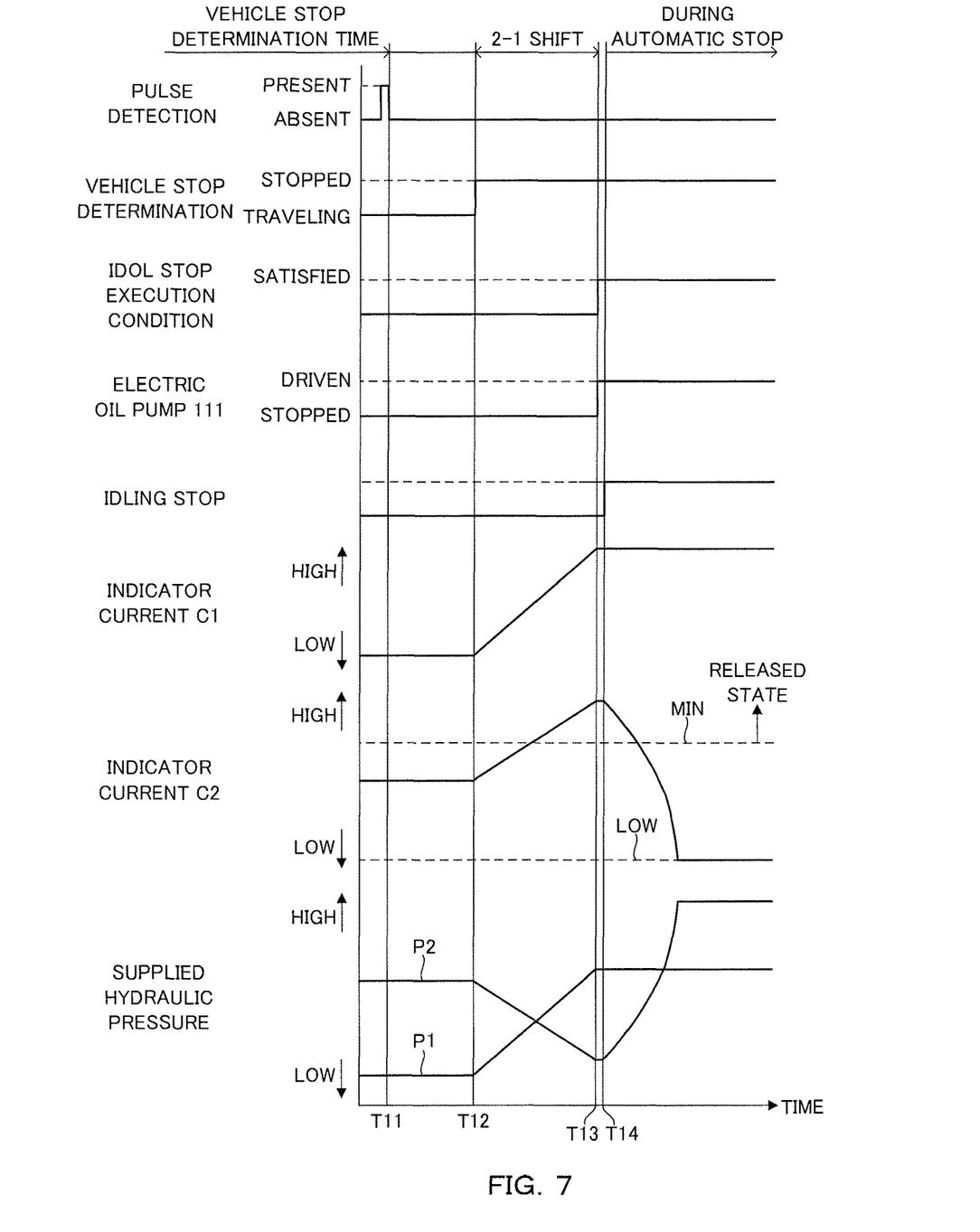
FIG. 7 is a diagram showing an example of a timing chart in a third embodiment.

FIG. 7 is a diagram showing an example of a timing chart corresponding to a control executed by the controller 12 in the present embodiment. The timing chart shown in FIG. 7 is the same as that shown in FIG. 4 except that changes of the indicator current C2 and a supplied hydraulic pressure P2 after timing T14 are different. Thus, points of difference are mainly described here.

In the present embodiment, the controller 12 serving as a solenoid control unit is configured to increase a decreasing degree of the indicator current C2 as an elapsed time becomes longer in reducing the indicator current C2 during the automatic stop of the engine 1. Thus, inclination magnitudes become gradually larger in the changes of the indicator current C2 and the supplied hydraulic pressure P2 from timing T14. Therefore, a torque transmission capacity of the second friction engaging element 32, hence, an increasing rate of the braking force by the second friction engaging element 32 increases as the elapsed time becomes longer.

According to the drive control device 100 relating to the present embodiment, since the controller 12 is configured as just described, the following functions and effects can be obtained.

Specifically, around timing T14 at which the decrease of the indicator current C2 is started, a situation where a sense of incongruity is given to the driver can be improved by suppressing the increasing rate of the braking force by the second friction engaging element 32. Further, by reducing the indicator current C2 more quickly as the elapsed time becomes longer and there is a higher possibility that the vehicle is stopped, it is also possible to reduce power consumption.

Fourth Embodiment

A drive control device 100 according to the present embodiment is configured similarly to the drive control device 100 in the first embodiment except that a controller 12 is configured as described below. A similar change may be made, for example, for the drive control devices 100 according to the second and third embodiments.

Here, the following situation possibly occurs in reducing a braking force by a second friction engaging element 32 by starting an increase of an indicator current C2 when an execution condition of an idling stop is no longer satisfied.

Specifically, at this time, power suddenly increased by the restart of an engine 1 is transmitted to drive wheels 5 via a first friction engaging element 31. The power transmitted to the drive wheels 5 is felt as a jump-out feeling of a vehicle and possibly gives a sense of incongruity to a driver.

In view of such a situation, the controller 12 is configured as described next in the present embodiment.

Figure 8:
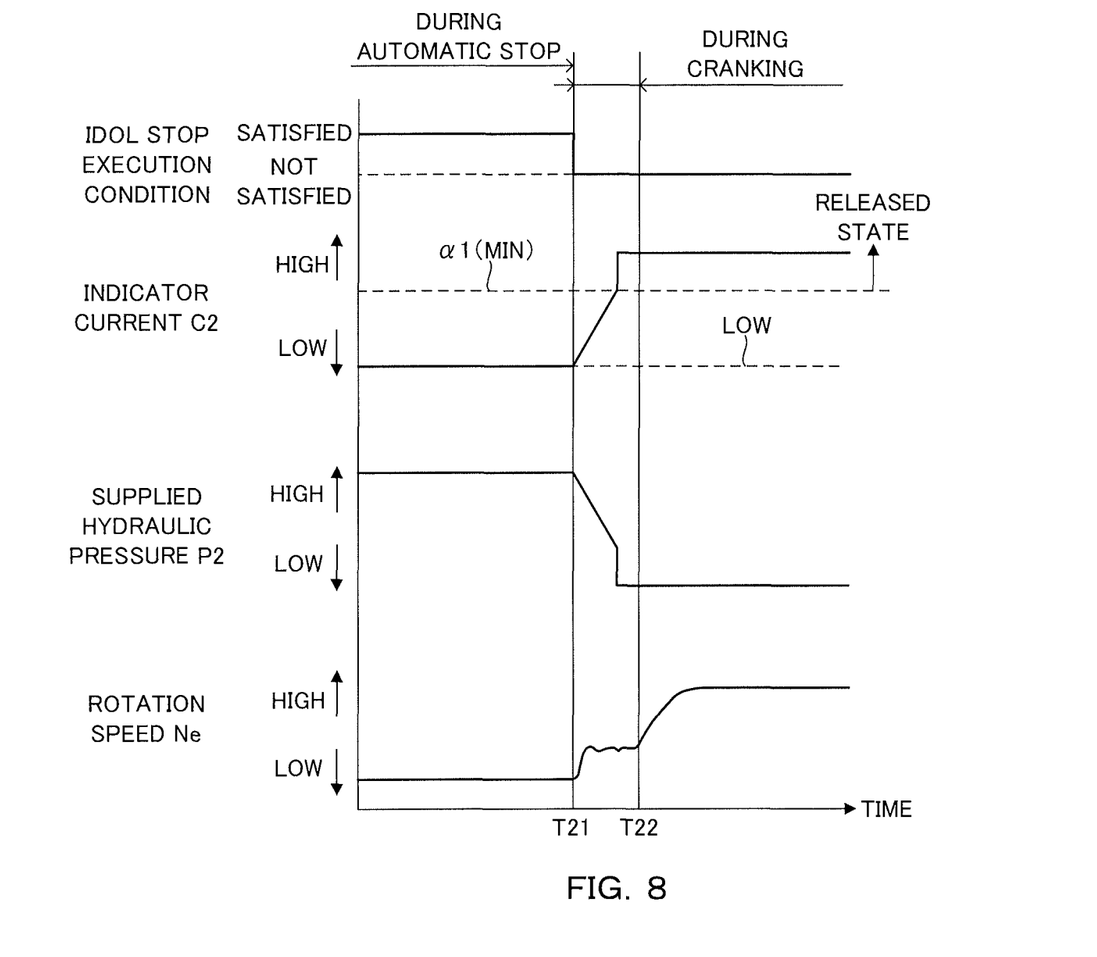
FIG. 8 is a diagram showing an example of a timing chart in a fourth embodiment.

FIG. 8 is a diagram showing an example of a timing chart corresponding to a control executed by the controller 12 in the present embodiment. The timing chart shown in FIG. 8 is the same as that shown in FIG. 5 except that changes of an indicator current C2 and a supplied hydraulic pressure P2 after timing T21 are different. Thus, points of differences are mainly described here.

In the present embodiment, the controller 12 serving as a solenoid control unit starts an increase of the indicator current C2 at timing T21 and gradually increases the indicator current C2 to a first current value $\alpha 1$. The current value $\alpha 1$ is a minimum value of the indicator current C2 at which the second friction engaging element 32 is released, i.e. a minimum value MIN.

Further, the controller 12 serving as the solenoid control unit increases the indicator current C2 in a stepwise manner if the indicator current C2 becomes larger than the first current value $\alpha 1$. Specifically, in this case, the controller 12 can, for example, continue to gradually increase the indicator current C2, but increases the indicator current C2 in a stepwise manner.

To gradually increase the indicator current C2, the indicator current C2 can be, for example, increased by a predetermined degree. The predetermined degree can be set in advance on the basis of an experiment or the like. To gradually increase the indicator current C2, the indicator current C2 can also be continuously increased such that a change thereof is represented by a curve.

According to the drive control device 100 relating to the present embodiment, since the controller 12 is configured as just described, the braking force by the second friction engaging element 32 can be gradually reduced while the second friction engaging element 32 is in a power transmission state. Thus, a jump-out feeling of a vehicle can be reduced. Thereafter, it is also possible to suppress unintended generation of a braking force by the second friction engaging element 32 due to a variation or the like by quickly increasing the indicator current C2.

Fifth Embodiment

A drive control device 100 according to the present embodiment is configured similarly to the drive control device 100 in the first embodiment except that a controller 12 is configured as described below. A similar change may be made, for example, for the drive control devices 100 according to the second and third embodiments.

Figure 9:
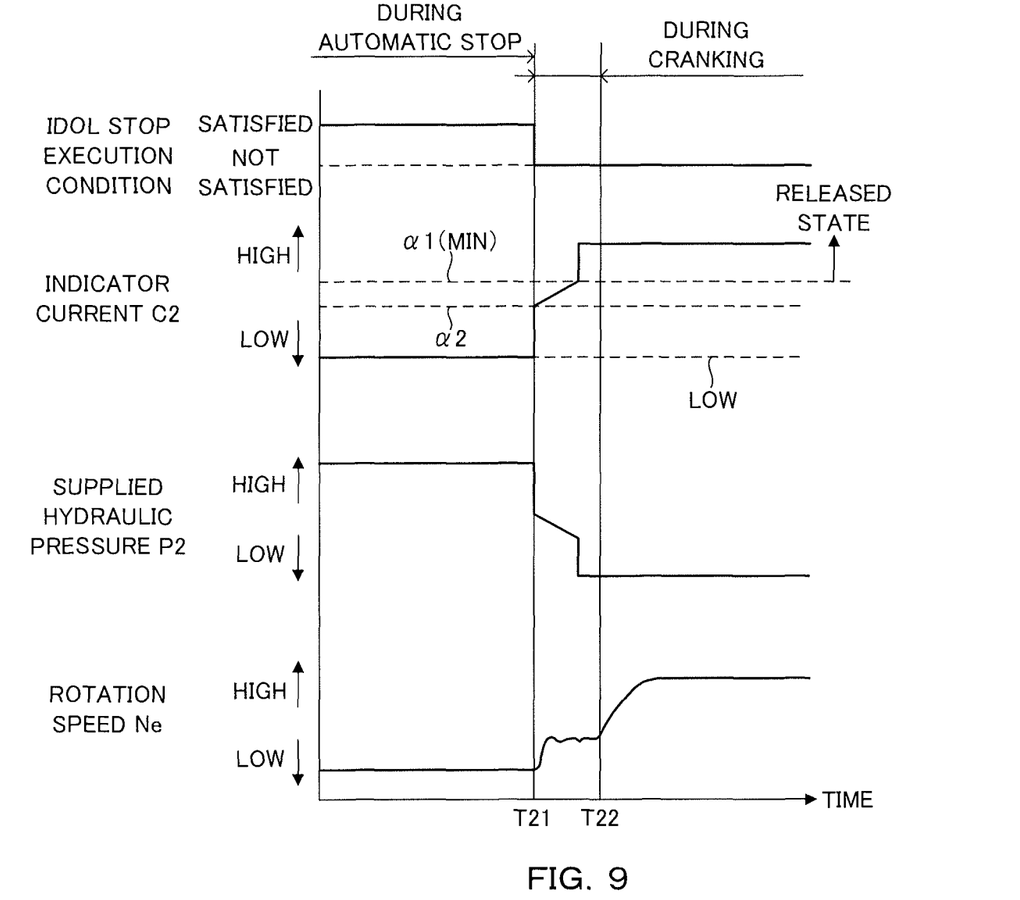
FIG. 9 is a diagram showing an example of a timing chart in a fifth embodiment.

FIG. 9 is a diagram showing an example of a timing chart corresponding to a control executed by the controller 12 in the present embodiment. The timing chart shown in FIG. 9 is the same as that shown in FIG. 5 except that changes of an indicator current C2 and a supplied hydraulic pressure P2 after timing T21 are different. Thus, points of differences are mainly described here.

In the present embodiment, the controller 12 serving as a solenoid control unit increases the indicator current C2 to a second current value $\alpha 2$ in a stepwise manner when an increase of the indicator current C2 is started at timing T21 and gradually increases the indicator current C2 from the second current value $\alpha 2$ to a first current value $\alpha 1$.

The second current value $\alpha 2$ is a current value at which differential rotation occurs in a second friction engaging element 32 due to an input torque from an engine 1 and can be set in advance on the basis of an experiment or the like. The input torque from the engine 1 is specifically a torque input during the cranking of the engine 1. The controller 12 serving as the solenoid control unit further increases the indicator current C2 in a stepwise manner if the indicator current C2 becomes larger than the first current value $\alpha 1$.

According to the drive control device 100 relating to the present embodiment, the controller 12 is configured as just described, wherefore it is possible to quickly increase the indicator current C2 until a slip state is reached where the second friction engaging element 32 can adjust the braking force and gradually reduce the braking force by the second friction engaging element 32 after the second friction engaging element 32 reaches the slip state. Thus, a jump-out feeling of a vehicle can be easily properly reduced since the indicator current C2 can be properly set.

Although the embodiments of the present invention have been described above, the above embodiments are merely an illustration of some application examples of the present invention and not intended to limit the technical scope of the present invention to the specific configurations of the above embodiments.

In the above embodiments, a case has been described where the decrease of the indicator current C2 is started simultaneously with the start of the automatic stop of the engine 1 according to the satisfaction of the execution condition of the idling stop.

However, the decrease of the indicator current C2 may be started, for example, upon the elapse of a predetermined time after the start of the automatic stop of the engine 1 according to the satisfaction of the execution condition of the idling stop. The predetermined time can be set in advance on the basis of an experiment or the like.

In the above embodiments, a case has been described where the first and second friction engaging elements 31, 32 establish the gear position in the sub-transmission mechanism 30.

However, for example, in the case of including a stepped automatic transmission mechanism, a friction engaging element for establishing a first speed gear position may be used as the first friction engaging element 31 and any one of friction engaging elements for establishing second and higher speed gear positions may be used as the second friction engaging element 32 in the stepped automatic transmission mechanism.

Further, for example, in the case of including a forward/reverse switching mechanism having a first forward speed and a first reverse speed, a friction engaging element for establishing a first forward speed gear position may be used as the first friction engaging element 31 and a friction engaging element for establishing a first reverse speed gear position may be used as the second friction engaging element 32.

In the above embodiments, a case has been described where the travel drive source is the engine 1. However, it is also possible to use, for example, a motor or a motor and the engine 1 as the travel drive source.

The present application claims a priority based on Japanese Patent Application No. 2015-165727 filed with the Japan Patent Office on Aug. 25, 2015, all the contents of which are hereby incorporated by reference.

The invention claimed is:

1. A vehicle drive control device, comprising:
a controller configured to automatically stop a travel drive source if an automatic stop condition is satisfied, the automatic stop condition being satisfied in a stopped state of a vehicle;
an electric oil pump configured to be driven during an automatic stop of the travel drive source according to the satisfaction of the automatic stop condition;
a first friction engaging element configured to have oil supplied thereto from the electric oil pump during the automatic stop and establish a starting gear position;
a second friction engaging element configured to be released when the vehicle starts with the first friction engaging element set in a power transmission state; and
a solenoid configured to drain the oil to be supplied to the second friction engaging element according to an indicator current, a drain degree of the solenoid becoming smaller by reducing the indicator current;
the controller being configured to reduce the indicator current to the solenoid below a minimum value of the indicator current during the automatic stop, the second friction engaging element being released at the minimum value.

2. The vehicle drive control device according to claim 1, wherein:
the travel drive source is an engine; and
the controller starts a decrease of the indicator current to the solenoid simultaneously with the start of the automatic stop of the engine according to the satisfaction of the automatic stop condition.

3. The vehicle drive control device according to claim 1, wherein:
the travel drive source is an engine configured to be restarted by fuel recovery performed at a recovery possible rotation speed or higher; and
the controller starts a decrease of the indicator current to the solenoid if the automatic stop of the engine according to the satisfaction of the automatic stop condition is started and a rotation speed of the engine becomes lower than the recovery possible rotation speed.

4. The vehicle drive control device according to claim 1, further comprising:

a pulse signal detector configured to detect a pulse signal indicating a rotating state of drive wheels, a drive force of the travel drive source being transmitted to the drive wheels, wherein the controller:
being configured to determine that the vehicle is stopped if an elapsed time after the detection of a pulse signal and before the detection of a next pulse signal by the pulse signal detector becomes equal to or longer than a vehicle stop determination time; and
increasing a decreasing degree of the indicator current to the solenoid as the elapsed time becomes longer.

5. The vehicle drive control device according to claim 1, wherein:
the indicator current to the solenoid has a lower limit value larger than zero and set in a range where an actual current value is detectable.

6. The vehicle drive control device according to claim 1, wherein:
the controller starts an increase of the indicator current to the solenoid if the automatic stop condition is no longer satisfied.

7. The vehicle drive control device according to claim 6, wherein the controller:
gradually increases the indicator current to the solenoid to a first current value, the first current value being the minimum value; and
increases the indicator current to the solenoid in a stepwise manner if the indicator current to the solenoid becomes larger than the first current value.

8. The vehicle drive control device according to claim 6, wherein the controller:
increases the indicator current to the solenoid to a second current value in a stepwise manner, differential rotation occurring in the second friction engaging element due to an input torque from the travel drive source at the second current value; and
gradually increases the indicator current to the solenoid from the second current value to a first current value, the first current value being the minimum value.

9. A control method for a vehicle drive control device with an electric oil pump, a first friction engaging element configured to have oil supplied thereto from the electric oil pump and establish a starting gear position, a second friction engaging element configured to be released when the vehicle starts with the first friction engaging element set in a power transmission state, and a solenoid configured to drain the oil to be supplied to the second friction engaging element according to an indicator current, a drain degree of the solenoid becoming smaller by reducing the indicator current, comprising:
automatically stopping a travel drive source if an automatic stop condition is satisfied, the automatic stop condition being satisfied in a stopped state of a vehicle;
driving the electric oil pump during an automatic stop of the travel drive source according to the satisfaction of the automatic stop condition and supplying the oil to the first friction engaging element and the second friction engaging element; and
reducing the indicator current to the solenoid below a minimum value of the indicator current during the automatic stop, the second friction engaging element being released at the minimum value.

10. A vehicle drive control device, comprising:
drive source control means for automatically stopping a travel drive source if an automatic stop condition is satisfied, the automatic stop condition being satisfied in a stopped state of a vehicle;
an electric oil pump configured to be driven during an automatic stop of the travel drive source according to the satisfaction of the automatic stop condition;
a first friction engaging element configured to have oil supplied thereto from the electric oil pump during the automatic stop and establish a starting gear position;
a second friction engaging element configured to be released when the vehicle starts with the first friction engaging element set in a power transmission state;
a solenoid configured to drain the oil to be supplied to the second friction engaging element according to an indicator current, a drain degree of the solenoid becoming smaller by reducing the indicator current; and
solenoid control means for reducing the indicator current to the solenoid below a minimum value of the indicator current during the automatic stop, the second friction engaging element being released at the minimum value.

* * * * *